(12) United States Patent
Riedell et al.

(10) Patent No.: US 7,628,878 B2
(45) Date of Patent: Dec. 8, 2009

(54) CERAMIC MATERIAL SUITABLE FOR REPAIR OF A SPACE VEHICLE COMPONENT IN A MICROGRAVITY AND VACUUM ENVIRONMENT, METHOD OF MAKING SAME, AND METHOD OF REPAIRING A SPACE VEHICLE COMPONENT

(75) Inventors: James A. Riedell, San Diego, CA (US); Timothy E. Easler, San Diego, CA (US)

(73) Assignee: COI Ceramics, Inc., San Diego, CA (US)

( * ) Notice: Subject to any disclaimer, the term of this patent is extended or adjusted under 35 U.S.C. 154(b) by 425 days.

(21) Appl. No.: 11/228,469

(22) Filed: Sep. 15, 2005

(65) Prior Publication Data
US 2009/0264273 A1    Oct. 22, 2009

Related U.S. Application Data

(60) Provisional application No. 60/646,455, filed on Jan. 24, 2005.

(51) Int. Cl.
*C03B 29/00* (2006.01)

(52) U.S. Cl. .................. 156/89.11; 427/140; 427/227; 427/387; 501/88; 501/97.2; 501/92; 501/96.1; 501/102; 501/122; 501/26; 501/128; 501/152; 501/154

(58) Field of Classification Search .......... 501/97.2, 501/88, 92, 96.1, 102, 122, 26, 128, 152, 501/154; 427/140, 227, 387; 156/89.11
See application file for complete search history.

(56) References Cited

U.S. PATENT DOCUMENTS

| | | | |
|---|---|---|---|
| 5,204,294 A * | 4/1993 | Matsumoto | 501/92 |
| 5,508,238 A * | 4/1996 | Zank | 501/87 |
| 5,582,861 A | 12/1996 | Schwab et al. | |
| 5,922,628 A | 7/1999 | Barton et al. | |
| 6,403,750 B1 | 6/2002 | Pope et al. | |
| 6,514,562 B1 | 2/2003 | Clark et al. | |
| 6,692,597 B2 | 2/2004 | Mako et al. | |
| 6,699,810 B2 | 3/2004 | Schwab et al. | |
| 2003/0102071 A1 * | 6/2003 | Mako et al. | 156/89.11 |

OTHER PUBLICATIONS

Starfire Systems, Starffie SMP-10, www.starfiresystems.com, visited Apr. 05, 2005, 2 pages.

\* cited by examiner

*Primary Examiner*—Randy Gulakowski
*Assistant Examiner*—Olatunde S Ojurongbe
(74) *Attorney, Agent, or Firm*—TraskBritt (57) ABSTRACT

A precursor of a ceramic adhesive suitable for use in a vacuum, thermal, and microgravity environment. The precursor of the ceramic adhesive includes a silicon-based, preceramic polymer and at least one ceramic powder selected from the group consisting of aluminum oxide, aluminum nitride, boron carbide, boron oxide, boron nitride, hafnium boride, hafnium carbide, hafnium oxide, lithium aluminate, molybdenum silicide, niobium carbide, niobium nitride, silicon boride, silicon carbide, silicon oxide, silicon nitride, tin oxide, tantalum boride, tantalum carbide, tantalum oxide, tantalum nitride, titanium boride, titanium carbide, titanium oxide, titanium nitride, yttrium oxide, zirconium diboride, zirconium carbide, zirconium oxide, and zirconium silicate. Methods of forming the ceramic adhesive and of repairing a substrate in a vacuum and microgravity environment are also disclosed, as is a substrate repaired with the ceramic adhesive.

36 Claims, 6 Drawing Sheets

CERAMIC MATERIAL SUITABLE FOR REPAIR OF A SPACE VEHICLE COMPONENT IN A MICROGRAVITY AND VACUUM ENVIRONMENT, METHOD OF MAKING SAME, AND METHOD OF REPAIRING A SPACE VEHICLE COMPONENT

CROSS-REFERENCE TO RELATED APPLICATIONS

This application claims the benefit of U.S. Provisional Patent Application Ser. No. 60/646,455, filed Jan. 24, 2005, for CERAMIC ADHESIVE SUITABLE FOR REPAIR OF A SPACE VEHICLE COMPONENT IN A MICROGRAVITY AND VACUUM ENVIRONMENT, AND METHOD OF REPAIR.

STATEMENT REGARDING FEDERALLY SPONSORED RESEARCH

The U.S. Government has a paid-up license in this invention and the right in limited circumstances to require the patent owner to license others on reasonable terms as provided for by the terms of Contract No. NAS8-97238 awarded by the National Aeronautics and Space Administration ("NASA").

FIELD OF THE INVENTION

The present invention relates to a ceramic material suitable for use in effecting a repair to a component of a space vehicle while outside the Earth's atmosphere. More specifically, the present invention relates to a ceramic material suitable for use in the vacuum, thermal, and microgravity environment of space to repair the space vehicle component, a method of forming the ceramic material, a method of repairing the space vehicle component, and a repaired space vehicle component.

BACKGROUND OF THE INVENTION

A method to repair a component of a space vehicle during orbit is needed, as evidenced by the tragic loss of the Columbia space shuttle. Particularly critical is the need for a method and material for repairing a component in the form of, for example, a leading portion of a wing or other control surface, or other leading portion of the space vehicle, which is designed and initially fabricated to experience and withstand extreme heat and an associated oxidation environment due to frictional contact with the Earth's atmosphere during high speed reentry of the space vehicle from orbit or other travel in outer space. As used herein, the term "space vehicle" refers to a manned or unmanned vehicle that is capable of traveling in outer space and reentering the Earth's atmosphere including, but not limited to, a space shuttle, a rocket, or a suitably configured satellite. However, repairing the component while the space vehicle remains in orbit poses unique challenges due to the vacuum and microgravity environment of space.

Ceramic adhesives are known in the art to bond two or more ceramic materials to one another. U.S. Pat. No. 6,692,597 to Mako et al. discloses a method of joining silicon carbide ("SiC") materials using a slurry of allylhydridopolycarbosilane ("AHPCS") and a multimodal SiC powder. The slurry is applied to each of the SiC materials and is heated to pyrolyze the AHPCS, forming a transition layer that bonds the SiC materials. U.S. Pat. No. 5,922,628 to Barton et al. discloses a method of joining ceramic and ceramic composite materials at a low temperature using a three-component, bonding agent. The bonding agent includes a preceramic polymer, an aluminum powder, and a boron powder. The bonding agent is applied as a layer between the ceramic materials and is heated to pyrolyze the preceramic polymer, bonding the ceramic materials. The bonding agent is also used to repair cracks, pinholes, or depressions in the ceramic and ceramic composite materials.

U.S. Pat. No. 5,582,861 to Schwab et al. discloses a method of repairing damage to an oxidation-resistant layer on a carbon/carbon composite. The oxidation-resistant layer is a layer of SiC or silicon nitride, which is applied to the carbon/carbon composite to prevent oxidation of the carbon. A damaged area of the oxidation resistant layer is repaired by applying a composition that consists essentially of a polymeric thermosetting polysilazane and a ceramic powder, such as SiC or silicon nitride. The composition is then cured and fired, converting the polysilazane to a ceramic.

While ceramic adhesives are used to join or bond ceramic substrates, conventional ceramic adhesives are not currently formulated to be used in space. As a consequence, no ceramic adhesive is available for repair while in space of a damaged component of the space shuttle, or other vehicle designed for high-speed reentry from space into the atmosphere of the Earth.

BRIEF SUMMARY OF THE INVENTION

The present invention relates to a precursor of a ceramic material suitable for use in a vacuum, thermal, and microgravity environment. The ceramic material comprises a silicon-based, preceramic polymer and at least one ceramic powder selected from the group consisting of aluminum oxide, aluminum nitride, boron carbide, boron oxide, boron nitride, hafnium boride, hafnium carbide, hafnium oxide, lithium aluminate, molybdenum silicide, niobium carbide, niobium nitride, silicon boride, silicon oxide, silicon nitride, tin oxide, tantalum boride, tantalum carbide, tantalum oxide, tantalum nitride, titanium boride, titanium carbide, titanium oxide, titanium nitride, yttrium oxide, zirconium diboride, zirconium carbide, zirconium oxide, and zirconium silicate.

The silicon-based, preceramic polymer may comprise a polycarbosilane, a polysilazane, a polysiloxane, or mixtures thereof, such as AHPCS, hydridopolysilazane, or mixtures thereof. The silicon-based, preceramic polymer may be present in the precursor of the ceramic material in a range of from approximately 10% by weight of a total weight of the precursor of the ceramic material to approximately 60% by weight of the total weight of the precursor of the ceramic material. The at least one ceramic powder may be present in a range of from approximately 40% by weight of the total weight of the precursor of the ceramic material to approximately 90% by weight of the total weight of the precursor of the ceramic material.

The present invention also relates to a precursor of a ceramic material suitable for use in a vacuum, thermal, and microgravity environment that comprises a silicon-based, preceramic polymer and a ceramic powder comprising a mixture of silicon carbide and at least one other ceramic powder selected from the group consisting of aluminum oxide, aluminum nitride, boron carbide, boron oxide, boron nitride, hafnium boride, hafnium carbide, hafnium oxide, lithium aluminate, molybdenum silicide, niobium carbide, niobium nitride, silicon boride, silicon oxide, silicon nitride, tin oxide, tantalum boride, tantalum carbide, tantalum oxide, tantalum nitride, titanium boride, titanium carbide, titanium oxide, titanium nitride, yttrium oxide, zirconium diboride, zirconium carbide, zirconium oxide, and zirconium silicate. In one exemplary embodiment, the at least one ceramic powder may comprise a mixture of 47.5% by weight of silicon carbide, 47.5% by weight of zirconium diboride, and 5% by weight of yttrium oxide.

The silicon-based, preceramic polymer may comprise a polycarbosilane, a polysilazane, a polysiloxane, or mixtures thereof, such as AHPCS, hydridopolysilazane, or mixtures thereof. The silicon-based, preceramic polymer may be present in the precursor of the ceramic material in a range of from approximately 10% by weight of a total weight of the precursor of the ceramic material to approximately 60% by weight of the total weight of the precursor of the ceramic material. The at least one ceramic powder may be present in a range of from approximately 40% by weight of the total weight of the precursor of the ceramic material to approximately 90% by weight of the total weight of the precursor of the ceramic material. In one exemplary embodiment, the silicon-based, preceramic polymer may be AHPCS and the at least one ceramic powder may be a mixture of silicon carbide, zirconium diboride, and yttrium oxide.

The present invention also relates to a method of forming a precursor of a ceramic material suitable for use in a vacuum, thermal, and microgravity environment of space. The method comprises mixing a silicon-based, preceramic polymer and at least one ceramic powder. The makeup of the silicon-based, preceramic polymer and the at least one ceramic powder are as described above.

The present invention also relates to a method of repairing a substrate in a vacuum, thermal, and microgravity environment of space. The method comprises providing a substrate and applying a precursor of a ceramic material to at least a portion of the substrate. The precursor of the ceramic material may be applied in a vacuum, thermal, and microgravity environment. The precursor of the ceramic material may include a silicon-based, preceramic polymer and at least one ceramic powder selected from the group consisting of aluminum oxide, aluminum nitride, boron carbide, boron oxide, boron nitride, hafnium boride, hafnium carbide, hafnium oxide, lithium aluminate, molybdenum silicide, niobium carbide, niobium nitride, silicon boride, silicon carbide, silicon oxide, silicon nitride, tin oxide, tantalum boride, tantalum carbide, tantalum oxide, tantalum nitride, titanium boride, titanium carbide, titanium oxide, titanium nitride, yttrium oxide, zirconium diboride, zirconium carbide, zirconium oxide, and zirconium silicate. The precursor of the ceramic material is cured in a vacuum, thermal, and microgravity environment and ceramified to form the ceramic material.

The silicon-based, preceramic polymer may comprise a polycarbosilane, a polysilazane, a polysiloxane, or mixtures thereof, such as AHPCS, hydridopolysilazane, or mixtures thereof. The substrate may be a carbon/carbon composite, such as a reinforced carbon/carbon composite or a ceramic matrix composite, having voids, vugs, gaps, cracks, or holes therein. Upon curing, the precursor of the ceramic material may form a hardened material on or within the at least a portion of the substrate. The precursor of the ceramic material may also be used to bond a patch member to the at least a portion of the substrate. The precursor of the ceramic material may be ceramified by exposing the cured precursor of the ceramic material to a temperature of greater than approximately 850° C. In one exemplary embodiment, the cured precursor of the ceramic material may be ceramified during reentry of a space vehicle comprising the substrate into the Earth's atmosphere.

The present invention also relates to a repaired substrate that is capable of withstanding reentry conditions. The repaired substrate comprises a substrate having at least one of a void, vug, gap, crack, and hole. The void, vug, gap, crack, or hole comprises a cured precursor of the ceramic material therein, wherein the cured precursor of the ceramic material is formulated to ceramify during reentry conditions. The cured precursor of the ceramic material may be formulated to ceramify to a microporous silicon carbide material under reentry conditions.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

A precursor of a ceramic material that includes a preceramic polymer and at least one ceramic powder is disclosed. As used herein, the term "precursor of the ceramic material" refers to the ceramic material before curing or ceramifying. The precursor of the ceramic adhesive may be processed in a vacuum or microgravity environment, enabling a substrate, such as a damaged substrate or a damaged substrate portion on a space vehicle, to be repaired while the space vehicle remains in orbit. The substrate may be repaired to protect the damaged substrate or damaged portion of the substrate from heat or oxidation, thus enabling the space vehicle to withstand the extreme heat and associated hostile oxidation environment generated by reentry of the space vehicle into the Earth's atmosphere. As such, the space vehicle may safely return to Earth. The precursor of the ceramic material may have good processability and working life in a vacuum. The precursor of the ceramic material may also provide oxidation resistance and good stability to the damaged substrate under reentry conditions.

The preceramic polymer used in the precursor of the ceramic material may be a silicon-based, preceramic polymer, such as a polycarbosilane ("PCS"), a polysilazane, a polysiloxane, derivatives thereof, or mixtures thereof. The preceramic polymer may be a polymeric precursor to SiC, silicon nitrocarbide ("SiNC"), or silicon oxycarbide ("SiOC"). Polycarbosilanes are commercially available, such as SMP-10 from Starfire Systems, Inc. (Malta, N.Y.). SMP-10 is a liquid precursor to SiC. Polysilazanes may include, but are not limited to, hydridopolysilazane ("HPZ"). Polysilazanes are commercially available under CERASET® tradename from KiON Corp. (Huntingdon Valley, Pa.). Polysiloxanes are commercially available from Dow Corning Corp. (Midland, Mich.). In one embodiment, the preceramic polymer is AHPCS.

The preceramic polymer may be present in the precursor of the ceramic material in an amount sufficient to bond the ceramic powder to the substrate. For instance, the preceramic polymer may be present at from approximately 10% by weight ("wt %") of a total weight of the precursor of the ceramic material to approximately 60 wt % of the total weight of the precursor of the ceramic material. In one exemplary embodiment, the preceramic polymer constitutes approximately 20 wt % of the total weight of the precursor of the ceramic material. The preceramic polymer may optionally include ultraviolet ("UV")-sensitive initiators (photoinitiators) to promote cure of the preceramic polymer. Alternatively, the UV-sensitive initiators may be added separately to the preceramic polymer. Such photoinitiators are known in the art and, therefore, are not discussed in detail herein.

The ceramic powder used in the precursor of the ceramic material may be stable to oxidation and may have a high melting point, such as a melting point above approximately 1649° C. (approximately 3000° F.). The ceramic powder may be a ceramic aluminate, boride, carbide, nitride, oxide, or silicide that is stable to oxidation and has a high melting point. The ceramic powder may include, but is not limited to, aluminum oxide, aluminum nitride, boron carbide, boron oxide, boron nitride, hafnium boride, hafnium carbide, hafnium oxide, lithium aluminate, molybdenum silicide, niobium carbide, niobium nitride, silicon boride, silicon carbide, silicon oxide, silicon nitride, tin oxide, tantalum boride, tantalum carbide, tantalum oxide, tantalum nitride, titanium boride, titanium carbide, titanium oxide, titanium nitride, yttrium oxide, zirconium diboride, zirconium carbide, zirconium oxide, zirconium silicate, or mixtures thereof. These ceramic powders are commercially available from various sources. In one exemplary embodiment, the ceramic powder includes a mixture of 47.5 wt % silicon carbide ("SiC"), 47.5 wt % zirconium diboride ("$ZrB_2$"), and 5 wt % yttrium oxide ("$Y_2O_3$").

The ceramic powder may have a particle size that ranges from approximately 1 nm to approximately 40 μm (−325 mesh). In addition to being used in a powder form, other morphologies of the ceramic may be used, such as nanoparticles, whiskers, or chopped fibers of the ceramic. If a mixture of ceramic powders is used, each of the ceramic powders may have a particle size that falls within this range. For the sake of example only, SiC used in the precursor of the ceramic material may have a particle size of approximately 0.6 μm, $ZrB_2$ may have a particle size that ranges from approximately 4 μm to approximately 7 μm, and $Y_2O_3$ may have a particle size of approximately 1 μm. The ceramic powder or mixture of ceramic powders may constitute from approximately 40 wt % of the total weight of the precursor of the ceramic material to approximately 90 wt % of the total weight of the precursor of the ceramic material. In one exemplary embodiment, the ceramic powder is present at approximately 80 wt % of the total weight of the precursor of the ceramic material.

The precursor of the ceramic material may be formed by mixing the preceramic polymer with the ceramic powder or mixture of ceramic powders. The preceramic polymer and the ceramic powder used in the precursor of the ceramic material may be substantially anhydrous. If water is present in either or both of the preceramic polymer or ceramic powder, the water may undesirably react with the preceramic polymer. The ceramic powder may be dried to remove any water that may be present before mixing with the preceramic polymer. The ceramic powder may be dried by conventional techniques, such as in an oven. Water may also be removed from the preceramic polymer, such as by flowing nitrogen gas through the preceramic polymer. The preceramic polymer and the ceramic powder may be mixed by conventional techniques, such as by hand, using a high shear mixer, or using a planetary mixer. Mixing the precursor of the ceramic material under vacuum may remove gases from the precursor of the ceramic material, which inhibits the formation of voids or pores during curing and during the conversion of the precursor of the ceramic material to the ceramic material. The preceramic polymer and the ceramic powder may be mixed under inert conditions, such as under argon.

The preceramic polymer and the ceramic powder may be mixed for an amount of time sufficient to form a substantially homogeneous mixture. If AHPCS is used as the preceramic polymer, solvents may not be needed to process the ceramic adhesive since AHPCS is a liquid at room temperature. However, if other preceramic polymers are used, conventional organic solvents may be used to process the preceramic polymer and ceramic powder. During mixing, the preceramic polymer and the ceramic powder may be maintained at a temperature of less than approximately 37.8° C. (approximately 100° F.). In one embodiment, the preceramic polymer and the ceramic powder are maintained at approximately room temperature (approximately 25° C.) during mixing. If the temperature increases during mixing, a water-cooled jacket may be used, as needed, to maintain the preceramic polymer and the ceramic powder at or near room temperature to inhibit potential reactions from occurring during processing.

The precursor of the ceramic material may have a paste- or putty-like consistency. Typical viscosity behavior for the precursor of the ceramic material is similar to the viscosity behavior (at 25° C.) shown in FIG. 1 for ATK NOAX-3124, a formulation according to the present invention which includes 20 wt % AHPCS and 80 wt % of a mixture of ceramic powders (47.5 wt % SiC, 47.5 wt % $ZrB_2$, and 5 wt % $Y_2O_3$). However, depending on a desired method of applying the precursor of the ceramic material to the substrate and whether or not the precursor of the ceramic material is to be used as a coating or as a bonding agent to adhere a patch member or element to the substrate, the relative amounts of the preceramic polymer and the ceramic powder may be adjusted to achieve a more viscous or a less viscous consistency. For instance, if a less viscous, precursor of the ceramic material is desired, an increased amount of the preceramic polymer may be used in the precursor of the ceramic material. Once formulated, the precursor of the ceramic material may be stored in a plastic or metal container until use. The container may be lined with an inert material, such as TEFLON®, to inhibit potential interactions between the precursor of the ceramic material and the material of the container.

The precursor of the ceramic material may be cured and ceramified in a vacuum, thermal, and microgravity environment, such as the conditions present in space. As such, the precursor of the ceramic material may be used to repair the damaged substrate or the damaged portion of the substrate while the space vehicle remains in orbit. Damage to the substrate may include voids, vugs, gaps, cracks, holes, or combinations thereof, which may form during takeoff or orbit of the space vehicle. For instance, the substrate may be scratched, cracked, fractured, or otherwise damaged on a surface thereof.

The substrate may be a carbon/carbon composite used on the space vehicle, such as a reinforced carbon/carbon composite ("RCC"). RCCs typically have a SiC coating on their surface. The substrate may also be formed from SiC or other refractory ceramic compositions, such as a ceramic matrix composite ("CMC"). Carbon/carbon composites are typically formed from woven carbon fibers that are surrounded by a dense carbon matrix. The carbon/carbon composite may be flat or otherwise extend in substantially two dimensions, or may be shaped into a three-dimensional structure. Carbon/carbon composites, RCCs, and CMCs are known in the art and are commonly used in space vehicles. Methods of producing carbon/carbon composites, RCCs, and CMCs are known in the art and, therefore, are not described in detail herein. While embodiments herein describe the substrate as an RCC, the precursor of the ceramic material may be used with other substrates that need thermal and oxidative protection during reentry into the Earth's atmosphere. If left unrepaired, the damaged substrate may be exposed to oxygen upon reentry in the presence of extreme heat generated by frictional contact with the Earth's atmosphere, which environment may lead to oxidation and failure of the substrate.

The precursor of the ceramic material may be applied to the substrate to cover and protect the damaged area. The precursor of the ceramic material may be applied at a temperature that ranges from approximately −1.1° C. (approximately 30° F.) to approximately 43.3° C. (approximately 110° F.). The precursor of the ceramic material may be applied in the vacuum, thermal, and microgravity environment, such as the conditions present in space. Depending on its viscosity, the precursor of the ceramic material may be applied by brush, spatula, trowel, caulk gun, or other suitable method of depositing the precursor of the ceramic material within and over the damaged area of the substrate. The precursor of the ceramic material may be used to fill the voids, vugs, gaps, cracks, or holes in the substrate. Alternatively, the precursor of the ceramic material may be used to bond a patch member or element over the damaged area of the substrate. The precursor of the ceramic material may also be used to fill gaps beneath the patch member. As such, the precursor of the ceramic material may be used as an adhesive, as a filler of voids, vugs, gaps, cracks, or holes in the substrate, or as a surface coating on the substrate. The patch member or element may be a carbon/carbon composite member or element or a refractory ceramic or CMC substrate. To bond the patch member to the substrate, the precursor of the ceramic material may be applied to at least one of the substrate and the patch member. The substrate and the patch member may be brought into contact before curing and converting the preceramic polymer to a ceramic, which are described in detail below.

Once applied to the substrate, the precursor of the ceramic material may be cured, to facilitate bonding of the precursor of the ceramic material to the substrate. As used herein, the term "cured precursor of the ceramic material" refers to the precursor of the ceramic material after curing. During curing, the preceramic polymer in the precursor of the ceramic material may crosslink, forming a hardened material on or within the damaged portion of the substrate. The cured precursor of the ceramic material may have a rubber-like or epoxy-like consistency and may have an amorphous structure. The precursor of the ceramic material may be cured in the vacuum, thermal, or microgravity environment of space using heat or photoradiation, such as visible, UV, infrared, or microwave radiation. The conditions used to cure the precursor of the ceramic material may depend on the specific nature of the preceramic polymer used in the precursor of the ceramic material. For instance, if the precursor of the ceramic material is to be thermally cured, the cure temperature may range from approximately 0° C. (approximately 32° F.) to approximately 260° C. (approximately 500° F.). Depending on the cure temperature, the precursor of the ceramic material may be cured in an amount of time ranging from a few minutes to a few days. By increasing the cure temperature, a shorter amount of time may be needed to cure the precursor of the ceramic material. Conversely, by decreasing the cure temperature, a longer amount of time may be needed. For safety and other practical reasons, the precursor of the ceramic material may be cured for an amount of time ranging from approximately 1 minute to approximately 36 hours. In one embodiment, the precursor of the ceramic material is cured in the vacuum of space at approximately 121° C. (approximately 250° F.) for approximately 2 hours. In another embodiment, the precursor of the ceramic material is cured at approximately 65.5° C. (approximately 150° F.) for from approximately 12 hours to approximately 18 hours. The heat used to cure the precursor of the ceramic material may be applied using a radiant heater or a heat blanket. Alternatively, since the temperature in space varies drastically depending on proximity and orientation to the sun, a space vehicle having the precursor of the ceramic material disposed thereon may be oriented in an appropriate orientation with respect to the sun to expose the precursor of the ceramic material to radiant heat from the sun and achieve a desired cure temperature. As previously mentioned, the precursor of the ceramic material may also be photocured using visible, UV, infrared, or microwave radiation.

After curing, the preceramic polymer may be converted into the ceramic material (a ceramic coating or ceramic adhesive). For instance, the cured precursor of the ceramic material may be exposed to an elevated temperature for a sufficient amount of time to ceramify the cured precursor of the ceramic material. The resulting ceramic material may have a substantially crystalline structure. To ceramify the cured precursor of the ceramic material, the cured precursor of the ceramic material may be exposed to a temperature greater than approximately 850° C., such as greater than approximately 1000° C. If the preceramic polymer used in the precursor of the ceramic material is AHPCS, the cured precursor of the ceramic material may harden and form SiC at a temperature that ranges from approximately 850° C. to approximately 1600° C. At a temperature greater than approximately 1600° C., the ceramic material may be substantially crystalline SiC. A temperature sufficient to form the ceramic material (i.e., a temperature sufficient to ceramify the cured precursor of the ceramic material) may be achieved upon reentry of the space vehicle into the Earth's atmosphere. In other words, the cured precursor of the ceramic material may be ceramified in-situ during reentry of the space vehicle into the Earth's atmosphere. During reentry, the temperature of leading portions of the space vehicle may be greater than or equal to approximately 1426° C. (greater than or equal to approximately 2600° F.), but typically reach from approximately 1600° C. (approximately 2912° F.) to approximately 1627° C. (approximately 2960° F.). The amount of time needed to ceramify the cured precursor of the ceramic material may depend on the temperature to which the cured precursor of the ceramic material is exposed and the thickness of the cured precursor of the ceramic material. A typical reentry time for a space vehicle in the form of a space shuttle is approximately 15 minutes, which is sufficient to ceramify the cured precursor of the ceramic material.

Arc jet testing of the cured precursor of the ceramic material may be used to simulate reentry conditions of the space vehicle because the plasma generated during the arc jet testing is representative of the reentry environment (high altitude atmosphere). Arc jet testing may also be used to simulate friction buildup on leading edges of the space vehicle. Arc jet testing is well known in the art and, therefore, is not described in detail herein.

Figure 2:
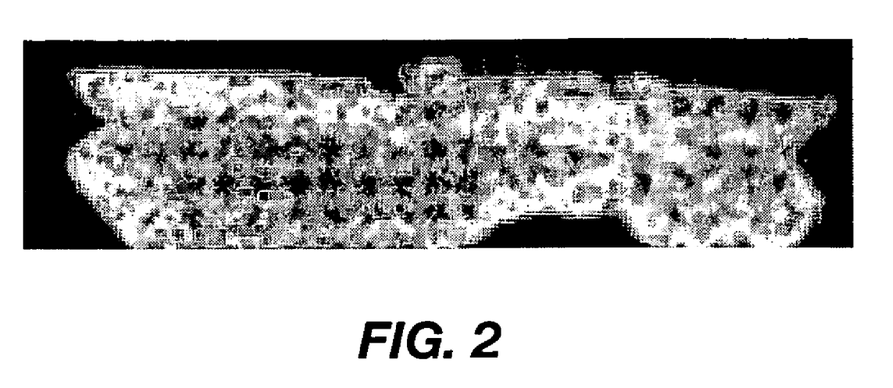
FIG. 2 is a computed tomography image showing the microstructure of a repaired test article using ATK NOAX-3124 processed in a vacuum environment, where the repaired volume is approximately 1.5 inches long ×0.25 inch deep ×0.035 1 inch wide.

The ceramic material formed by ceramifying the cured precursor of the ceramic material may form a uniform oxidation barrier that protects the damaged area of the substrate. The ceramic material may provide thermal and oxidative stability to the repaired area during reentry of the space vehicle from space into the Earth's upper atmosphere. As such, the ceramic material may protect the damaged area of the substrate from subsequent damage. For instance, the ceramic material may provide the repaired area of the substrate with resistance to high temperatures, such as those achieved during reentry. The ceramic material may have a microporous structure that includes a plurality of small voids, as shown in FIG. 2. The width of the ceramic material shown in FIG. 2 is 1.5 inches. The microporous structure of the ceramic material may provide durability and flow resistance to the repaired substrate. Without being bound to a particular theory, it is believed that the voids in the ceramic material deflect or otherwise impede the spread of cracks that may form in the substrate during reentry of the space vehicle, which is a property typically referred to as fracture toughness. Consequently, cracks do not propagate through the substrate.

While repairing the damaged area of the substrate has been described using one coating or layer of the precursor of the ceramic material, multiple coatings may also be used. For instance, a first coating of the precursor of the ceramic material may be applied to the damaged area of the substrate and cured, as previously described, forming a first coating of the cured precursor of the ceramic material in the damaged area. A second, or subsequent, coating of the precursor of the ceramic material may be applied to the damaged area, over the first coating. The second, or subsequent, coating may be cured, forming a second, or subsequent, coating of the cured precursor of the ceramic material in the damaged area. The multiple coatings of the cured precursor of the ceramic material may then be ceramified, as previously described, forming the ceramic material in the damaged area of the substrate.

The ceramic material may fill the voids, vugs, gaps, cracks, or holes in the substrate, protecting these damaged areas from heat and oxidation during reentry. If the ceramic material is used to bond the patch member or element to the substrate, the ceramic material may form a layer between the substrate and the patch member or element.

In one embodiment, the substrate is a RCC used on the space vehicle. The RCC may be damaged, such as during takeoff or orbit of the space vehicle, and, therefore, may need thermal and oxidation protection before its reentry into the Earth's atmosphere. The precursor of the ceramic material may be applied to the damaged portion of the RCC while the space vehicle remains in orbit. As previously explained, the precursor of the ceramic material may be cured and ceramified in the microgravity, thermal, and vacuum environment of space, converting the precursor of the ceramic material to the ceramic material. Once repaired, the space vehicle may safely reenter into the upper atmosphere from space.

The precursor of the ceramic material may also be used for ground-based repairs and, therefore, is not limited to use in a vacuum, thermal, or microgravity environment. For the ground-based repairs, the precursor of the ceramic material may be used in substantially the same manner as previously described. For instance, the precursor of the ceramic material may be used as a "touch-up" material to fill voids, vugs, gaps, cracks, holes, or combinations thereof in the substrate when the substrate is on the ground. When the substrate is on the ground, the precursor of the ceramic material may be applied to the substrate at ambient temperature and ambient pressure. The precursor of the ceramic material may then be cured and ceramified, forming the ceramic material. The precursor of the ceramic material may be cured using heat or photoradiation and may then be exposed to an elevated temperature to ceramify the cured precursor of the ceramic material. The precursor of the ceramic material may also be used to bond the patch member or element over the damaged area of the substrate when the substrate is on the ground.

The following examples serve to explain embodiments of the present invention in more detail. These examples are not to be construed as being exhaustive or exclusive as to the scope of this invention.

EXAMPLES

Example 1

Formulation of ATK NOAX-3124

A precursor of a ceramic material that included 20 wt % AHPCS and 80 wt % of a mixture of ceramic powders (47.5 wt % SiC, 47.5 wt % $ZrB_2$, and 5 wt % $Y_2O_3$) was prepared by mixing the ceramic powders with the AHPCS. The AHPCS and the ceramic powders were mixed using a planetary mixer to improve the homogeneity of the mixture. The AHPCS and the ceramic powders were mixed under vacuum (approximately 28 in. Hg) to facilitate removal of volatile material from the mixture. This ceramic adhesive according to the present invention is referred to as ATK NOAX-3124, the "ATK" material, or the "ATK/COIC" material.

Example 2

Characterization of ATK NOAX-3124

Figure 3:
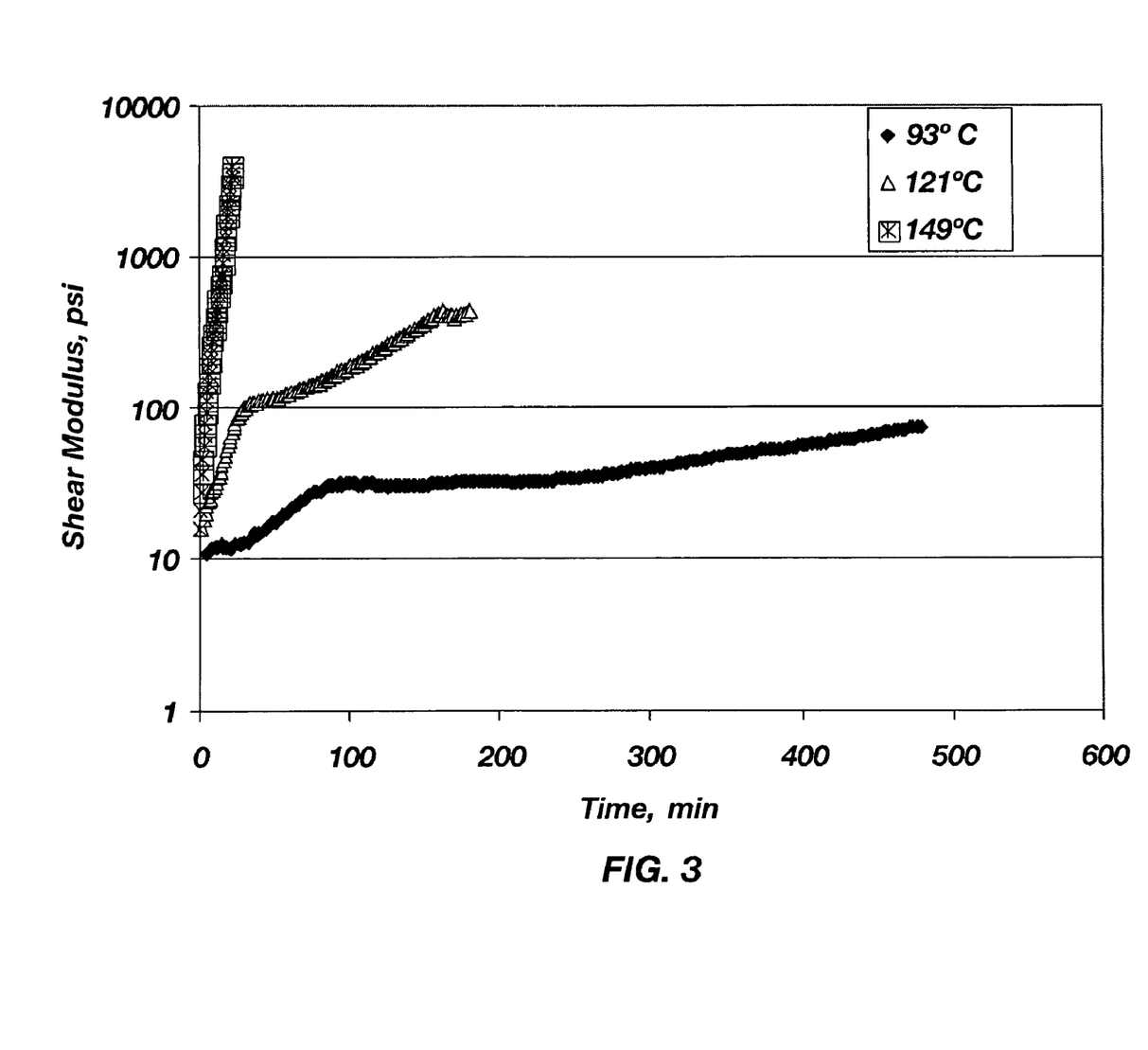
FIG. 3 illustrates the rheology of an exemplary embodiment of the precursor of the ceramic material, ATK NOAX-3124.

The ceramic adhesive described in Example 1 was characterized by ARES mechanical spectrometry, thermogravimetric analysis ("TGA"), differential scanning calorimetry ("DSC"), and Shore A hardness. The ceramic adhesive was characterized using conventional techniques. The ARES mechanical spectrometry was conducted by conventional techniques using an ARES rheometer (available from TA Instruments) to determine the strain, strain rate, and shear stress as a function of time and temperature of the ceramic adhesive. The shear modulus of ATK NOAX-3124 as a function of time and temperature is shown in FIG. 3.

Dynamic TGA was conducted on ATK NOAX-3124 by conventional techniques using a TA Instruments 2950 thermogravimetric analyzer to determine the weight loss of the ceramic adhesive as a function of temperature in nitrogen. The results of the TGA testing are shown in Table 1.

TABLE 1

| TGA Analysis of ATK NOAX-3124. | |
|---|---|
| Wt % remaining at 600° C. | 97.14 |
| Wt % remaining at 875° C. | 97.03 |

DSC testing was conducted on ATK NOAX-3124 by conventional techniques using a TA Instruments differential scanning calorimeter to measure heat flow as a function of temperature to determine the heat of reaction ("$\Delta H_{RXN}$"), glass transition temperature ("$T_g$"), optimum cure temperature, and degree of cure of the ceramic adhesive. The DSC testing was conducted at a linear heating rate of 5° C./minute from −50° C. to 300° C. The results of the DSC testing are shown in Table 2.

TABLE 2

DSC Testing of ATK NOAX-3124.

| | $\Delta H_{RXN}$ (J/g) | Temperature Range of $\Delta H_{RXN}$ | | Temperature Onset of $\Delta H_{RXN}$ (° C.) | $T_g$ (° C.) |
|---|---|---|---|---|---|
| | | Start, ° C. | Stop, ° C. | | |
| ATK NOAX-3124 | 5.003 | 94.0 | 178.7 | 111.6 | −12.2 |

The cure time of ATK NOAX-3124 at specific temperatures was determined by conventional techniques and is shown in Table 3.

TABLE 3

Cure Time of ATK NOAX-3124.

| Cure Temperature (° C.) | Cure Time (minutes) |
|---|---|
| 93 | 556 |
| 121 | 168 |
| 149 | 21 |

Figure 1:
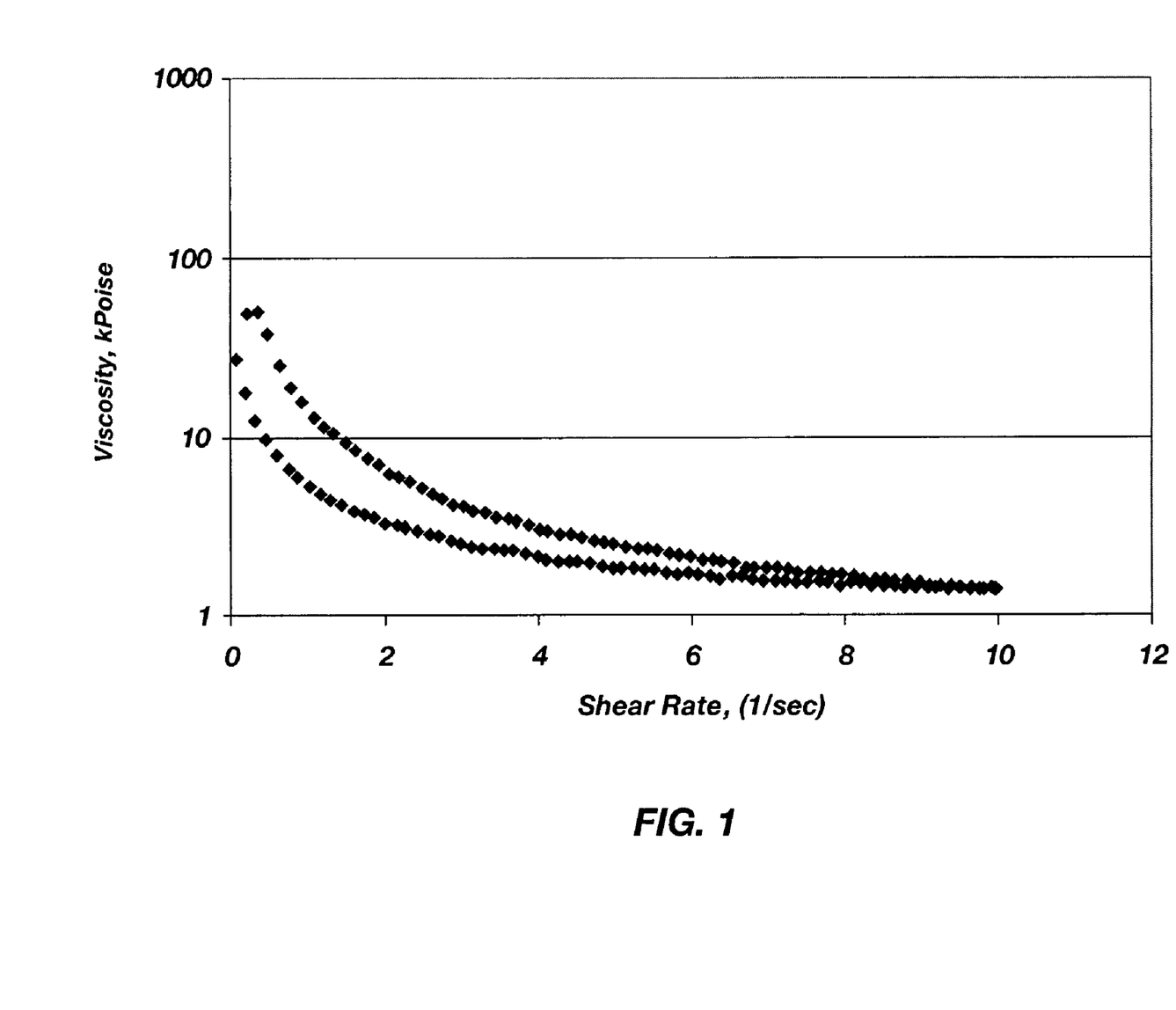
FIG. 1 shows the viscosity of ATK NOAX-3124 at 25° C.
Figure 4:
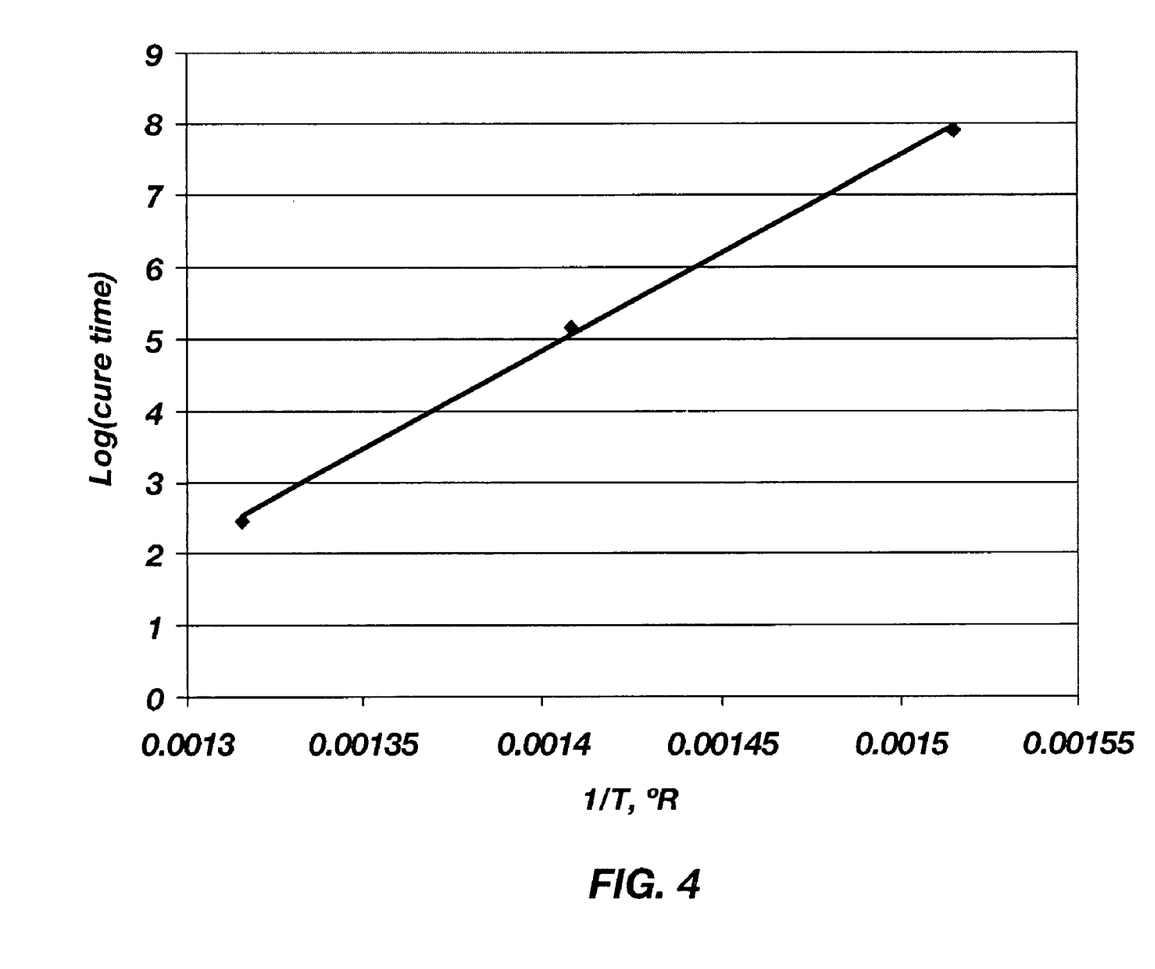
FIG. 4 is an Arrhenius plot showing the amount of time at a given temperature that the shear modulus of ATK NOAX-3124 takes to reach 500 pounds per square inch ("psi")

The viscosity of the ceramic adhesive was determined by conventional techniques and is shown in FIG. 1. The viscosity was measured from a static to a dynamic to a static condition by ramping the viscometer from a shear rate of zero 1/sec to a shear rate of 10 1/sec over two minutes and then back to a shear rate of zero 1/sec. In the first static condition, the viscosity of the ceramic adhesive was high. As the shear rate increased, the viscosity of the ceramic adhesive decreased. Then, as the shear rate was decreased back to a shear rate of 0 1/sec, the ceramic adhesive exhibited a thixotropic loop where the viscosity of the ceramic adhesive increased, but at a different rate. An Arrhenius plot indicating the amount of time at a given temperature that the shear modulus of the ceramic adhesive took to reach 500 psi is shown in FIG. 4.

Example 3

Repair of RCC using ATK NOAX-3124

Figure 5:
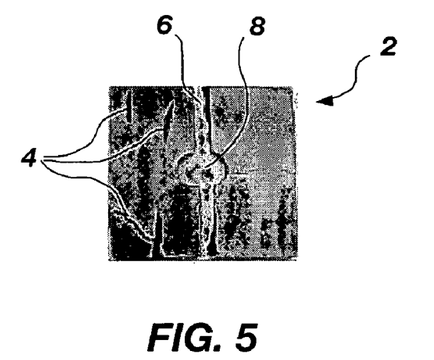
FIG. 5 shows a damaged reinforced carbon/carbon composite coupon.
Figure 6:
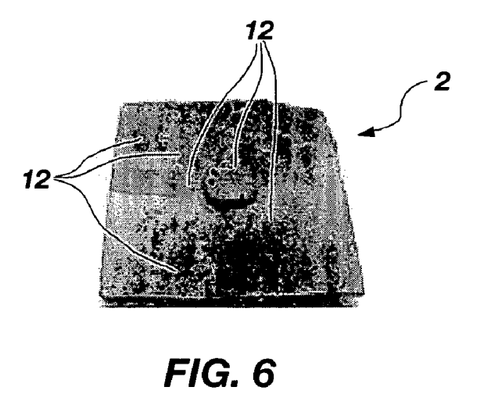
FIG. 6 shows the damaged coupon of FIG. 5 that has been repaired with ATK NOAX-3124.

FIGS. 5 and 6 illustrate an RCC 2 (substrate) that had surface scratches 4 or cracks and a fracture 6 with a through hole 8 approximately /7;16 inch (approximately 1.11 cm) in diameter. ATK NOAX-3124 was applied to the RCC 2, filling in the surface scratches 4, the fracture 6, and the through hole 8. The ATK NOAX-3124 was then cured under vacuum at 65.5° C. (150° F.) for up to 18 hours. After curing, the surface scratches 4, the fracture 6, and the through hole 8 were filled with the cured adhesive 12, repairing the RCC 2.

Figure 7:
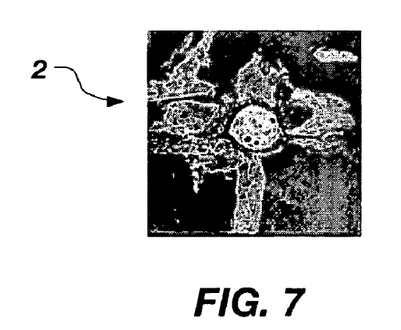
FIG. 7 shows the repaired coupon of FIG. 6 after being subjected to a torch test.

The repaired RCC was then subjected to torch testing using an oxy-propane torch to simulate a reentry environment. In the torch test, the repaired RCC was subjected to a heat flux of approximately 130 BTU/ft$^2$ sec for approximately 15 minutes in atmospheric conditions, during which the surface temperature reached approximately 3000° F. FIG. 7 shows the RCC 2 after being subjected to the torch testing.

Figure 8:
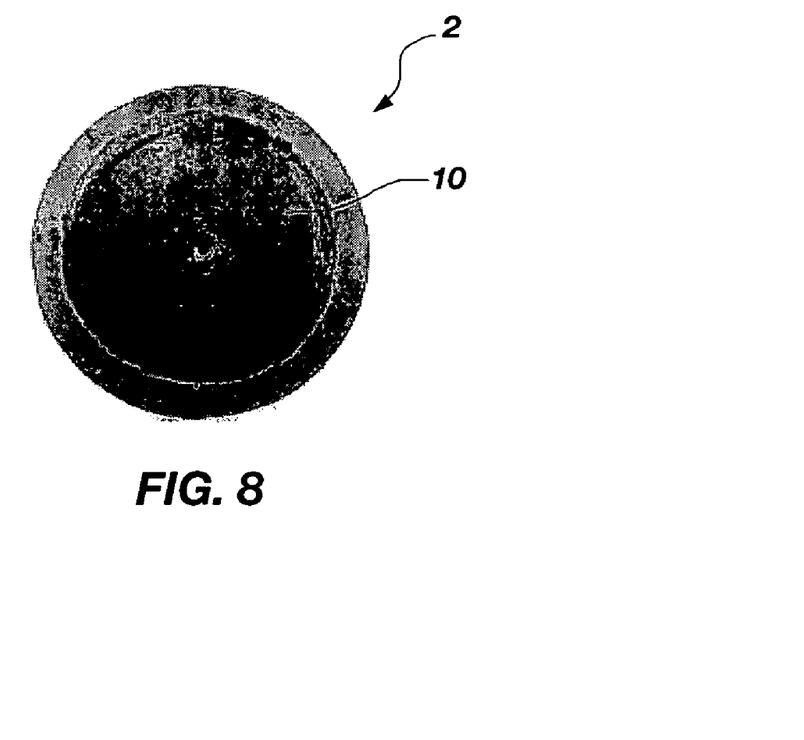
FIG. 8 shows a pretest arc jet coupon repaired with a patch mechanically attached and bonded to the pretest arc jet coupon with ATK NOAX-3124.
Figure 9:
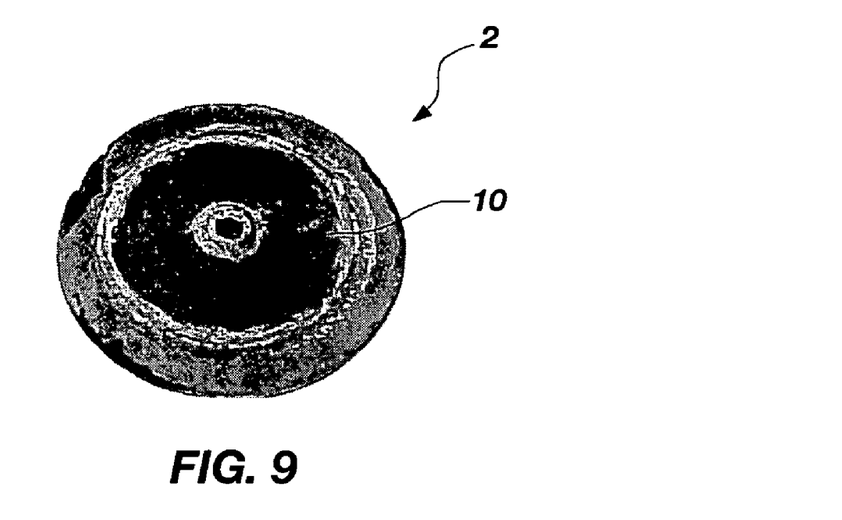
FIG. 9 shows the coupon of FIG. 8 after arc jet testing.

ATK NOAX-3124 was also used to bond and seal a patch 10 to the RCC 2, as shown in FIG. 8. The patch 10 was bonded over the through hole 8 (not visible) in the RCC 2 and held in place with a fastener. The repaired coupon was then subjected to arc jet testing. In the arc jet testing, an RCC substrate that had not been repaired was used to determine the set point conditions (atmosphere in the test chamber or heater and surface temperature of the RCC) for the test. The desired conditions in the arc jet test produce surface temperatures of approximately 2700° F. and approximately 2960° F. on the RCC. The surface pressure at these conditions was approximately 120 pounds per square foot ("psf"). After determining these conditions, this RCC was replaced with the repaired coupon and the arc jet test was performed on the repaired coupon at the established conditions. The RCC repaired with ATK NOAX-3124 was exposed to a plasma arc environment at approximately 2700° F. (+/−50° F.) for 200 seconds. The plasma arc was generated by heating a mixture of gases (23% by mass $O_2$ and 77% by mass $N_2$). The arc heater current was provided by a 10 MW power supply that is regulated by four silicon controlled rectifiers. The temperature was then increased to approximately 2960° F. (+/−50° F.) for 500 seconds. The surface pressure was maintained at approximately 120 psf (+/−20° F.). The surface temperature of the RCC was monitored using optical pyrometers. FIG. 9 shows the RCC 2 after being subjected to arc jet testing.

While the invention may be susceptible to various modifications and alternative forms, specific embodiments have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A precursor of a ceramic material, consisting of:
a polycarbosilane; and
a ceramic powder consisting of a mixture of silicon carbide, zirconium diboride, and yttrium oxide.

2. The precursor of the ceramic material of claim 1, wherein the precursor of the ceramic material consists of the polycarbosilane in approximately 20% by weight of the total weight of the precursor of the ceramic material.

3. The precursor of the ceramic material of claim 1, wherein the polycarbosilane comprises allylhydridopolycarbosilane.

4. The precursor of the ceramic material of claim 1, wherein the polycarbosilane is present in the precursor of the ceramic material in a range of from approximately 10% by weight of the total weight of the precursor of the ceramic material to approximately 60% by weight of the total weight of the precursor of the ceramic material.

5. The precursor of the ceramic material of claim 1, wherein the at least one ceramic powder is present in the precursor of the ceramic material in a range of from approximately 40% by weight of a total weight of the precursor of the ceramic material to approximately 90% by weight of the total weight of the precursor of the ceramic material.

6. A precursor of a ceramic material, consisting essentially of:
allylhydridopolycarbosilane; and
a ceramic powder consisting of a mixture of silicon carbide, zirconium diboride, and yttrium oxide.

7. The precursor of the ceramic material of claim 6, wherein the allylhydridopolycarbosilane is present in the precursor of the ceramic material in a range of from approximately 10% by weight of the total weight of the precursor of the ceramic material to approximately 60% by weight of the total weight of the precursor of the ceramic material.

8. The precursor of the ceramic material of claim 6, wherein the ceramic powder consists of a mixture of 47.5% by weight of silicon carbide, 47.5% by weight of zirconium diboride, and 5% by weight of yttrium oxide.

9. The precursor of the ceramic material of claim 6, wherein the ceramic powder is present in the precursor of the ceramic material in a range of from approximately 40% by weight of the total weight of the precursor of the ceramic material to approximately 90% by weight of the total weight of the precursor of the ceramic material.

10. A method of forming a precursor of a ceramic material, comprising:
    mixing a polycarbosilane and a ceramic powder to form a precursor of a ceramic material, the ceramic powder consisting of a mixture of silicon carbide zirconium diboride, and yttrium oxide.

11. The method of claim 10, wherein mixing the polycarbosilane and the ceramic powder consists of mixing allylhydridopolycarbosilane with the ceramic powder.

12. A method of forming a precursor of a ceramic material comprising:
    mixing allylhydridopolycarbosilane and a ceramic powder to form a precursor of a ceramic material, the ceramic powder consisting of a mixture of silicon carbide, zirconium diboride, and yttrium oxide.

13. The method of claim 12, wherein mixing allylhydridopolycarbosilane and a ceramic powder consist of mixing the allylhydridopolycarbosilane with a mixture consisting of 47.5% by weight of silicon carbide, 47.5% by weight of zirconium diboride, and 5% by weight of yttrium oxide.

14. A method of repairing a substrate in a vacuum and microgravity environment, comprising:
    applying a precursor of a ceramic material to at least a portion of a substrate, the precursor of the ceramic material consisting essentially of allylhydridopolycarbosilane and a ceramic powder consisting of a mixture of silicon carbide, zirconium diboride, and yttrium oxide;
    curing the precursor of the ceramic material in a vacuum and microgravity environment; and
    ceramifying the precursor of the ceramic material to form the ceramic material.

15. The method of claim 14, wherein applying a precursor of a ceramic material to at least a portion of a substrate comprises applying the precursor of the ceramic material consisting essentially of allylhydridopolycarbosilane and the ceramic powder consisting of 47.5% by weight of silicon carbide, 47.5% by weight of zirconium diboride, and 5% by weight of yttrium oxide.

16. The method of claim 14, wherein applying a precursor of a ceramic material to at least a portion of a substrate comprises disposing the precursor of the ceramic material between a patch member and the at least a portion of the substrate prior to curing the precursor of the ceramic material.

17. The method of claim 14, wherein applying a precursor of a ceramic material to at least a portion of a substrate comprises applying the precursor of the ceramic material to at least one void, at least one vug, at least one gap, at least one crack, at least one hole, or a combination thereof in the substrate.

18. The method of claim 14, wherein curing the precursor of the ceramic material in a vacuum and microgravity environment comprises forming a hardened material bonded to the at least a portion of the substrate.

19. The method of claim 14, wherein curing the precursor of the ceramic material in a vacuum and microgravity environment comprises curing the precursor of the ceramic material under vacuum at a temperature that ranges from approximately 0° C. to approximately 260° C.

20. The method of claim 14, wherein ceramifying the precursor of the ceramic material to form the ceramic material comprises exposing the precursor of the ceramic material to a temperature of greater than approximately 850° C.

21. The method of claim 14, wherein ceramifying the precursor of the ceramic material to form the ceramic material comprises ceramifying the precursor of the ceramic material during reentry of a space vehicle comprising the substrate into the Earth's atmosphere.

22. The method of claim 14, further comprising bonding a patch member to the at least a portion of the substrate before curing the precursor of the ceramic material in a vacuum and microgravity environment.

23. The method of claim 22, wherein bonding a patch member to the at least a portion of the substrate comprises bonding a carbon/carbon composite member to the at least a portion of the substrate.

24. The method of claim 22, wherein bonding a patch member to the at least a portion of the substrate comprises bonding the patch member over a void, vug, gap, crack, hole, or a combination thereof in the substrate.

25. A repaired substrate capable of withstanding conditions experienced by a space vehicle reentering the Earth's atmosphere from space, the repaired substrate comprising:
    a substrate having a void, vug, gap, crack, hole, or a combination thereof, the void, vug, gap, crack, hole, or combination thereof comprising a cured precursor of a ceramic material therein, wherein an uncured precursor of the ceramic material consists of allylhydridopolycarbosilane and a ceramic powder consisting of a mixture of silicon carbide, zirconium diboride, and yttrium oxide and wherein the cured precursor of the ceramic material is formulated to convert from a preceramic polymer to a ceramic material under reentry conditions.

26. The repaired substrate of claim 25, further comprising a patch member bonded to the substrate by the cured precursor of the ceramic material.

27. A precursor of a ceramic material, comprising:
    a silicon-based, preceramic polymer; and
    a ceramic powder consisting of a mixture of 47.5% by weight of silicon carbide, 47.5% by weight of zirconium diboride, and 5% by weight of yttrium oxide.

28. The precursor of the ceramic material of claim 27, wherein the silicon-based, preceramic polymer comprises a polycarbosilane, a polysilazane, a polysiloxane, or mixtures thereof.

29. The precursor of the ceramic material of claim 27, wherein the silicon-based, preceramic polymer comprises allylhydridopolycarbosilane or hydridopolysilazane.

30. The precursor of the ceramic material of claim 27, wherein the silicon-based, preceramic polymer is present in the precursor of the ceramic material in a range of from approximately 10% by weight of the total weight of the precursor of the ceramic material to approximately 60% by weight of the total weight of the precursor of the ceramic material.

31. The precursor of the ceramic material of claim 27, wherein the at least one ceramic powder is present in the precursor of the ceramic material in a range of from approximately 40% by weight of the total weight of the precursor of the ceramic material to approximately 90% by weight of the total weight of the precursor of the ceramic material.

32. A method of forming a precursor of a ceramic material, comprising:
   mixing a silicon-based, preceramic polymer and a ceramic powder to form a precursor of a ceramic material, the precursor of the ceramic material consisting of a mixture of 47.5% by weight of silicon carbide, 47.5% by weight of zirconium diboride, and 5% by weight of yttrium oxide.

33. A method of repairing a substrate in a vacuum and microgravity environment, comprising:
   applying a precursor of a ceramic material to at least a portion of a substrate, the precursor of the ceramic material consisting of a mixture of 47.5% by weight of silicon carbide, 47.5% by weight of zirconium diboride, and 5% by weight of yttrium oxide;
   curing the precursor of the ceramic material in a vacuum and microgravity environment; and
   ceramifying the precursor of the ceramic material to form the ceramic material.

34. A precursor of a ceramic material, comprising:
   from approximately 10% by weight to approximately 20% by weight of allylhydridopolycarbosilane; and
   a ceramic powder consisting of a mixture of silicon carbide, zirconium diboride, and yttrium oxide.

35. A precursor of a ceramic material, consisting of:
   at least one silicon-based, preceramic polymer; and
   a ceramic powder consisting of a mixture of silicon carbide, yttrium oxide, and at least one of hafnium boride, hafnium carbide, and hafnium oxide.

36. The precursor of the ceramic material of claim 35, wherein the at least one silicon-based, preceramic polymer comprises allylhydridopolycarbosilane or hydridopolysilazane.

* * * * *

UNITED STATES PATENT AND TRADEMARK OFFICE
CERTIFICATE OF CORRECTION

PATENT NO. : 7,628,878 B2  
APPLICATION NO. : 11/228469  
DATED : December 8, 2009  
INVENTOR(S) : James A. Riedell and Timothy E. Easler It is certified that error appears in the above-identified patent and that said Letters Patent is hereby corrected as shown below:

| | | |
|---|---|---|
| COLUMN 1, | LINE 10, | change "APPLICATIONS" to --APPLICATION-- |
| COLUMN 1, | LINE 25, | change "Contract No. NAS8-97238" to --Contract No. NAS9-20000-- |
| COLUMN 4, | LINE 23, | change "long x0.25" to --long x 0.25-- |
| COLUMN 4, | LINE 24, | change "deep x0.035 1 inch" to --deep x 0.035 inch-- |
| COLUMN 5, | LINE 3, | change "N.Y.)." to --NY).-- |
| COLUMN 5, | LINE 7, | change "Pa.)." to --PA).-- |
| COLUMN 5, | LINE 9, | change "Mich.)." to --MI).-- |
| COLUMN 5, | LINE 29, | change "C. (approximately 3000° F.)." to --C (approximately 3000° F).-- |
| COLUMN 6, | LINE 29, | change "37.8° C." to --37.8° C-- |
| COLUMN 6, | LINE 30, | change "100° F.)." to --100° F).-- |
| COLUMN 6, | LINE 32, | change "25° C.)" to --25° C)-- |
| COLUMN 6, | LINE 41, | change "25° C.)" to --25° C)-- |
| COLUMN 7, | LINE 29, | change "−1.1° C." to -- −1.1° C-- |
| COLUMN 7, | LINE 30, | change "F.) to approximately 43.3° C. (approximately 110° F.)." to --F) to approximately 43.3° C (approximately 110° F).-- |
| COLUMN 8, | LINE 5, | change "0° C. (approximately 32° F.)" to --0° C (approximately 32° F)-- |
| COLUMN 8, | LINE 6, | change "C. (approximately 500° F.)." to --C (approximately 500° F).-- |
| COLUMN 8, | LINE 17, | change "121° C." to --121° C-- |
| COLUMN 8, | LINE 18, | change "250° F.)" to --250° F)-- |
| COLUMN 8, | LINE 20, | change "65.5° C. (approximately 150° F.)" to --65.5° C (approximately 150° F)-- |
| COLUMN 8, | LINE 42, | change "850° C.," to --850° C,-- |
| COLUMN 8, | LINE 46, | change "850° C." to --850° C-- |
| COLUMN 8, | LINE 47, | change "1600° C.," to --1600° C,-- |
| COLUMN 8, | LINE 57, | change "1426° C." to --1426° C-- |
| COLUMN 8, | LINE 58, | change "2600° F.)," to --2600° F),-- and change "1600° C." to --1600° C-- |
| COLUMN 8, | LINE 59, | change "2912° F.) to approximately 1627° C." to --2912° F) to approximately 1627° C-- |
| COLUMN 8, | LINE 60, | change "2960° F.)." to --2960° F).-- |
| COLUMN 10, | LINE 62, | change "600° C." to --600° C-- |
| COLUMN 10, | LINE 63, | change "875° C." to --875° C-- |
| COLUMN 11, | LINE 5, | change "C./minute" to --C/minute-- |
| COLUMN 11, | LINE 6, | change "−50° C." to -- −50° C-- |

CERTIFICATE OF CORRECTION (continued)
U.S. Pat. No. 7,628,878 B2

| | | |
|---|---|---|
| | COLUMN 11, LINE 15, | change the column headings "Start, ° C." to --Start, ° C--, "Stop, ° C." to --Stop, ° C--, "$\Delta H_{RXN}$ (° C.)" to --$\Delta H_{RXN}$ (° C)-- and "(° C.)" to --(° C)-- |
| | COLUMN 11, LINE 29, | change the column heading "(° C.)" to --(° C)-- |
| | COLUMN 11, LINE 56, | change "/7;16 inch" to --7/16 inch-- |
| | COLUMN 11, LINE 60, | change "65.5° C. (150° F.)" to --65.5° C (150° F)-- |
| | COLUMN 12, LINE 12, | change "2700° F. and approximately 2960° F." to --2700° F and approximately 2960° F-- |
| | COLUMN 12, LINE 19, | change "2700° F. (+/− 50° F.)" to --2700° F (+/− 50° F)-- |
| | COLUMN 12, LINE 24, | change "2960° F. (+/− 50° F.)" to --2960° F (+/− 50° F)-- |
| | COLUMN 12, LINE 26, | change "(+/− 20° F.)." to --(+/− 20° F).-- |
| CLAIM 19, | COLUMN 14, LINE 5, | change "0° C." to --0° C-- |

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,628,878 B2  Page 1 of 1
APPLICATION NO. : 11/228469
DATED : December 8, 2009
INVENTOR(S) : Riedell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Twenty-first Day of December, 2010

David J. Kappos
*Director of the United States Patent and Trademark Office*